US009952426B2

(12) United States Patent
Grossmann

(10) Patent No.: US 9,952,426 B2
(45) Date of Patent: Apr. 24, 2018

(54) AUTOSTEREOSCOPIC SYSTEM

(71) Applicant: SeeFront GmbH, Hamburg (DE)

(72) Inventor: Christoph Grossmann, Hamburg (DE)

(73) Assignee: SeeFront GmbH, Hamburg (DE)

( * ) Notice: Subject to any disclaimer, the term of this patent is extended or adjusted under 35 U.S.C. 154(b) by 369 days.

(21) Appl. No.: 14/723,952

(22) Filed: May 28, 2015

(65) Prior Publication Data

US 2016/0349503 A1 Dec. 1, 2016

(51) Int. Cl.
*G02B 27/00* (2006.01)
*G02B 27/22* (2018.01)
*H04N 13/04* (2006.01)

(52) U.S. Cl.
CPC ..... *G02B 27/0012* (2013.01); *G02B 27/0093* (2013.01); *G02B 27/2214* (2013.01); *H04N 13/0402* (2013.01); *H04N 13/0409* (2013.01); *H04N 13/0454* (2013.01); *H04N 13/0468* (2013.01); *H04N 13/0481* (2013.01); *H04N 13/0484* (2013.01); *H04N 13/0497* (2013.01)

(58) Field of Classification Search
CPC .............. G02B 27/225; G02B 27/2214; H04N 13/04–13/0497
See application file for complete search history.

(56) References Cited

U.S. PATENT DOCUMENTS

| 5,448,322 | A  | * | 9/1995  | Bacs, Jr. | ............... | G02B 27/646 348/135 |
| 5,771,066 | A  | * | 6/1998  | Barnea    | ............... | H04N 13/0404 348/54 |
| 6,233,071 | B1 | * | 5/2001  | Orr       | ............... | G02B 5/0252 359/15 |
| 6,271,896 | B2 | * | 8/2001  | Moseley   | ............... | G02B 27/2214 348/51 |
| 6,302,541 | B1 |   | 10/2001 | Grossmann |                 |                |
| 7,697,751 | B2 | * | 4/2010  | Rhodes    | ............... | H04N 13/0003 345/419 |
| 8,077,195 | B2 |   | 12/2011 | Grossmann |                 |                |
| 8,857,028 | B2 | * | 10/2014 | Gates     | ............... | G02B 27/2292 29/407.01 |
| 9,019,354 | B2 |   | 4/2015  | Grossmann |                 |                |
| 2007/0242237 | A1 | * | 10/2007 | Thomas | ............... | G02B 27/225 353/94 |
| 2010/0073463 | A1 | * | 3/2010  | Momonoi | ............... | G02B 27/2214 348/47 |
| 2011/0075256 | A1 | * | 3/2011  | De Zwart | ............... | G02B 27/2214 359/463 |

* cited by examiner

*Primary Examiner* — Bumsuk Won
*Assistant Examiner* — Jeffrey Madonna
(74) *Attorney, Agent, or Firm* — Richard M. Goldberg

(57) ABSTRACT

A method of constructing a channel mask for an autostereoscopic display, the display including an electronically controlled screen covered by a parallax filter device that includes a refractive medium and is configured to obscure certain areas on the screen for a left eye of a viewer and to obscure certain other areas on the screen for a right eye of the viewer, the channel mask being a two-dimensional geometric object that permits to assign to each point on the screen one of a number of viewing positions of an eye of the viewer, the method including the step of constructing the channel mask by tracing light rays that propagate from selected points on the screen and are refracted at the parallax filter device.

5 Claims, 9 Drawing Sheets

AUTOSTEREOSCOPIC SYSTEM

BACKGROUND OF THE INVENTION

The invention relates to a method of constructing a channel mask for an autostereoscopic display, the display comprising an electronically controlled screen covered by a parallax filter device that includes a refractive medium and is configured to obscure certain areas on the screen for a left eye of a viewer and to obscure certain other areas on the screen for a right eye of the viewer, the channel mask being a two-dimensional geometric object that permits to assign one of a number of pre-defined viewing positions of an eye of the viewer to each point on the screen.

According to the general principles of stereoscopy, an impression of spatial depth is generated by presenting to the two eyes of a viewer two different images that show the same scene from slightly different perspectives which represent the parallax difference between the left right and eye of the viewer.

Conventional systems for presenting different images to the left and right eyes of the user employ headsets or shutter glasses which, however, are quite disturbing for the user.

U.S. Pat. No. 8,077,195 B2 describes a system which permits to view autostereoscopic images "with the naked eye", so that stereoscopic images can for example be produced on a screen of a computer monitor or the like. To that end, the image information of the left and right channels, i.e. the information intended for the left and right eye, respectively, of the user, is displayed on the screen in the form of segments, i.e. vertical or slanted stripes, which alternatingly belong to the left and to the right channel, and a parallax filter device, e.g. in the form of a lens array of cylindrical lenses is arranged in front of the screen and is carefully positioned relative to the pixel raster of the screen, so that the light emitted from the various screen pixels is deflected such that, for a specific position of the viewer, the information of each channel is visible only for one eye. A head tracking or eye tracking system may be employed for adapting the image representation on the screen to changing positions of the viewer. When a specific viewing position has been determined, a channel mask is constructed in order to appropriately assign the correct channel to each pixel.

The concept of channel masks may be extended to multi-view systems wherein the screen can be watched by one or more viewers from a number of different view positions. Then, the channel mask will define three or more channels, one for each of the envisaged viewing directions, i.e. the envisaged positions of an eye of a viewer.

The channel masks may be defined in an object plane, i.e. the plane that forms the surface of the screen, and in a principal plane of the parallax filter, which principal plane is somewhat offset from the object plane towards the viewer(s). For example, in case of a parallax filter in the form of an array of cylindrical lenses, the principal plane may be the plane that contains the apex lines of the cylindrical lenses.

When a viewer watches an area of the screen at right angles, one half of each cylindrical lens will deflect the light from the underlying screen pixels towards the left side of the user's face, and the other half of the lens will deflect the light of the underlying pixels towards the right side of the user's face. Consequently, the alternating pattern of apex lines of the cylindrical lenses and border lines between adjacent lenses will naturally define a channel mask in the principal plane, and a corresponding channel mask in the object plane can simply be obtained by an orthogonal projection in the direction normal to the screen.

However, if the screen is viewed under a certain skew angle, the skew angle being defined as an angle between the line of sight from the viewer to a point on the screen and a normal to the screen at this point, then, for this area of the screen, the channel mask in the object plane will be laterally offset relative to the channel mask in the principal plane. The amount of this offset will also be influenced by the refraction of the light rays at the apex of each lens.

Since the skew angles under which the screen is seen will generally be relatively small, the effect of the refraction can be compensated with reasonable accuracy by defining an auxiliary object plane between the object plane and the principal plane, the position of this auxiliary object plane being determined by the ratio between the refractive indices of the surrounding medium (air) and of the glass forming the lens, such that the channel mask in the object plane can be obtained by a central projection of the channel mask in the principal plane onto the auxiliary object plane, with the viewing position as projection center.

SUMMARY OF THE INVENTION

It is an object of the invention to improve the optical quality of the autostereoscopic display.

In order to achieve this object, according to the invention, the channel mask is constructed by tracing light rays that propagate from selected points on the screen and are refracted at the parallax filter device.

According to the invention, the steps of constructing a channel mask in the principal plane and then applying a central projection onto the auxiliary object plane are integrated into a single step of tracing light rays from the surface of the screen through the refractive medium of the parallax filter to a given viewing position or, equivalently, tracing back the light rays from the viewing position through the refractive medium onto the screen surface. This permits to construct a channel mask directly in the object plane, whereas the corresponding channel mask in the principal plane is defined only implicitly.

The invention has the advantage that a refraction-corrected channel mask is obtained which is more accurate in particular for large skew angles. This permits to provide an autostereoscopic display with high image quality even for larger screen dimensions. Moreover, this method permits to adapt the system more easily to different types of parallax filter devices and also to displays with curved screens, for example.

Preferred embodiments of the invention will now be described in conjunction with the drawings, wherein:

DETAILED DESCRIPTION

Figure 1:
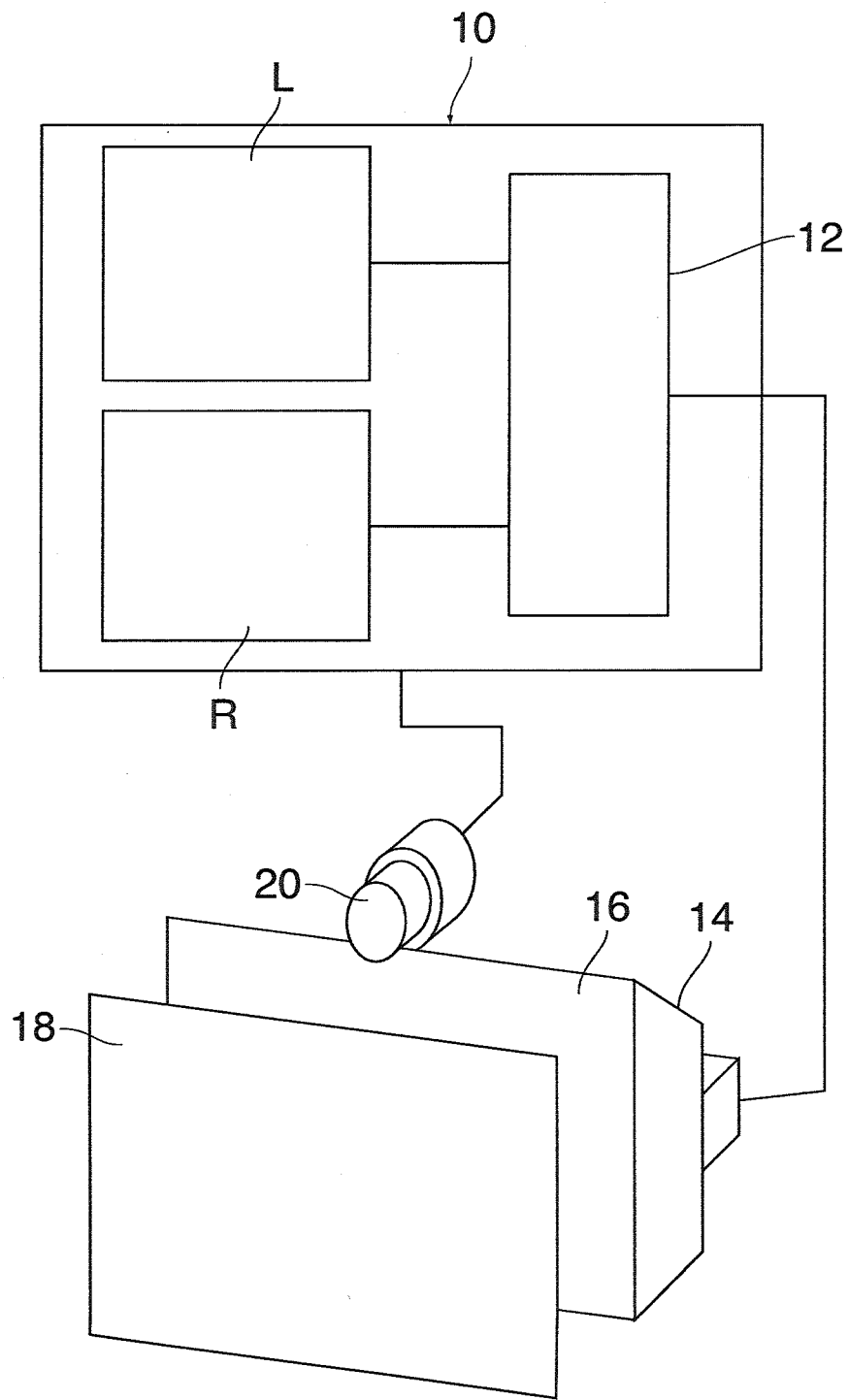
FIG. 1 is a block diagram of an autostereoscopic system.

The system shown in FIG. 1 comprises a computer system 10, e.g. a personal computer, including a graphics card 12 which drives a display 14 so as to display images on a screen 16 of the display. A parallax filter device, e.g. a lens array 18 is disposed in front of the screen 16, and a video camera forming part of an eye tracking or head tracking system 20 is attached to the display 14 and communicates with the computer system 10.

The graphics card 12 has access to two texture maps L and R that are stored in a memory of the computer system 10. The texture map L stores image information of a left channel, i.e. image information that is to be displayed to the left eye of a user (not shown) who looks at the screen 16 through the lens array 18. Similarly, the texture map R stores image information of the right channel for the right eye of the user. The head tracking system 20 keeps track of any movements of the head of the user and signals these movements to the computer system, which will then adapt the information displayed on the screen 16 to the changed position of the user.

Figure 2:
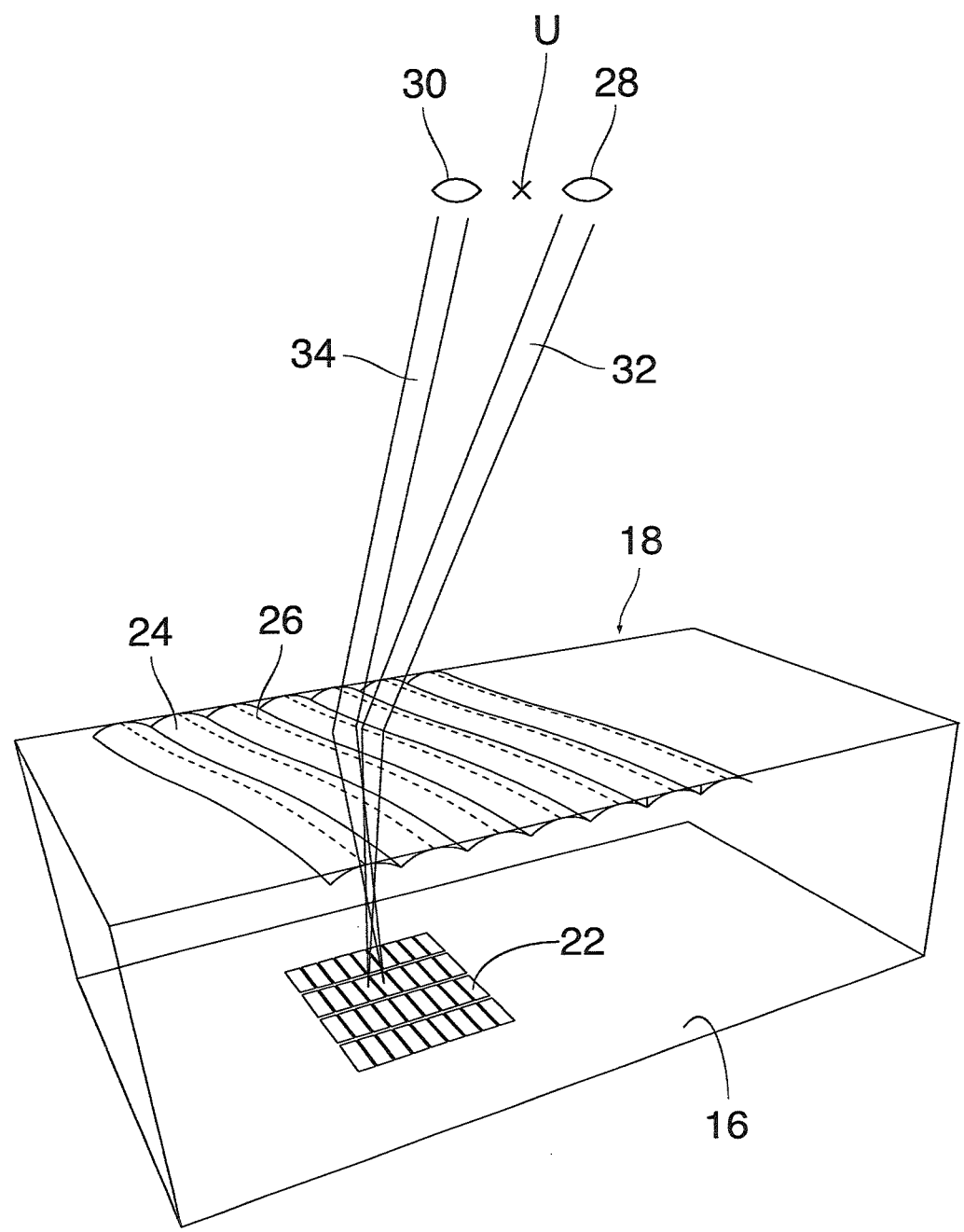
FIG. 2 a schematic perspective view of a portion of a screen and a superposed parallax filter device.

FIG. 2 is a schematic perspective view showing a part of the lens array 18 and a part of the screen 16. The surface of the screen 16 is divided into an array of individually controllable light emitting pixels 22. In case of a color screen, the pixels 22 will actually be sub-pixels in the basic colors red, green and blue.

The lens array 18 is constituted by a layer of glass or another transparent refractve medium and has a large number of cylindrical lenses 24 disposed in parallel and side-by-side. The cylindrical lenses 24 either extend approximately in vertical direction of the screen or may be inclined relative to the vertical and, accordingly, relative to the raster of the pixels 22 on the screen. In FIG. 2, the cylindrical lenses 24 are also shown to be slightly curved. This may be due to manufacturing tolerances, or the curvature may have been formed on purpose e.g. in order to further reduce Moiré effects resulting from a superposition of the regular lens raster on an also regular pixel raster. The width of the cylindrical lenses 24 is typically an integer or fractional multiple, of the width of an individual sub-pixel, typically at least three times its width. Each cylindrical lens has an apex line 26 shown as a dashed line in FIG. 2.

Right and left eyes 28, 30 of a viewer have been shown schematically in FIG. 2. A point U at the center between the two eyes 28, 30 marks a reference position of a viewer watching the screen 16. Two light rays 32, 34 have been shown to symbolize light that is emitted from two neighboring pixels 22 on the screen 16, is collimated by one of the cylindrical lenses 24 and deflected to the right eye and the left eye, respectively, of the user. The distance between the top surface of the lens array 18 and the surface of the screen 16 may be equal to, smaller or even larger than the focal length of the lenses 24, so that each eye will see an enlarged image of a corresponding pixel or parts thereof. The enlarged images of the pixels 22 that are visible for the eye 28, for example, through all the cylindrical lenses 24 fill the entire field of view, whereas other pixels remain invisible for that eye. On the other hand, there are pixels that are visible for the other eye 30 but invisible for the eye 28. Thus, it is possible to control the pixels 22 such that different images are presented to the right eye 28 and the left eye 30 of the user, so that the user perceives a three-dimensional image.

Figure 3:
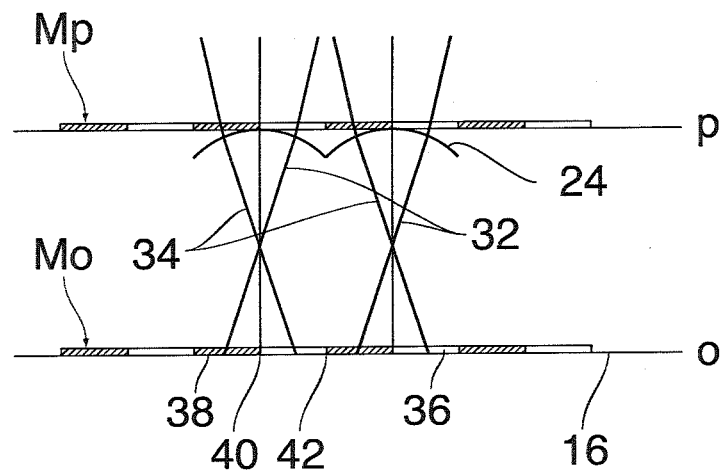
FIG. 3 is a diagram illustrating a construction of a channel mask for a viewing position on a normal to the screen.

FIG. 3 is a cross-sectional view of two of the cylindrical lenses 24. A top surface of the screen 16 is designated as an object plane o of the lens array, and the plane passing through the apex lines 26 of the lenses 24 is designated as a principal plane p. When the screen 16 is viewed at rights angles, i.e. from a position on a normal to the screen, light that is emitted from a part of the screen below the left half of a lens 24 will be deflected towards the left eye of the viewer, as is symbolized by rays 34 in FIG. 3, whereas light that is emitted from areas of the screen 16 underneath the right half of a lens 24 is deflected towards the right eye, so that it can be seen only by the right eye of the user, as symbolized by rays 32 in FIG. 3.

Consequently, a channel mask Mo can be defined which divides the surface of the screen 16 into left channel zones 36 that are visible only by the left eye (or are not visible at all) and right channel zones 38 that are visible only by the right eye (or not visible at all). A first-type boundary between the zones 36, 38 corresponds to the position of the apex of a lens 24, and a second-type boundary 42 corresponds to the boundary between two adjacent lenses 24. Since, thus, the channel mask is defined by the geometry of the lens array 18, it is convenient to consider a channel mask Mp in the principal plane. When the pertinent part of the screen 16 is watched at right angles, as in FIG. 3, the channel masks Mp and Mo are congruent.

Figure 4:
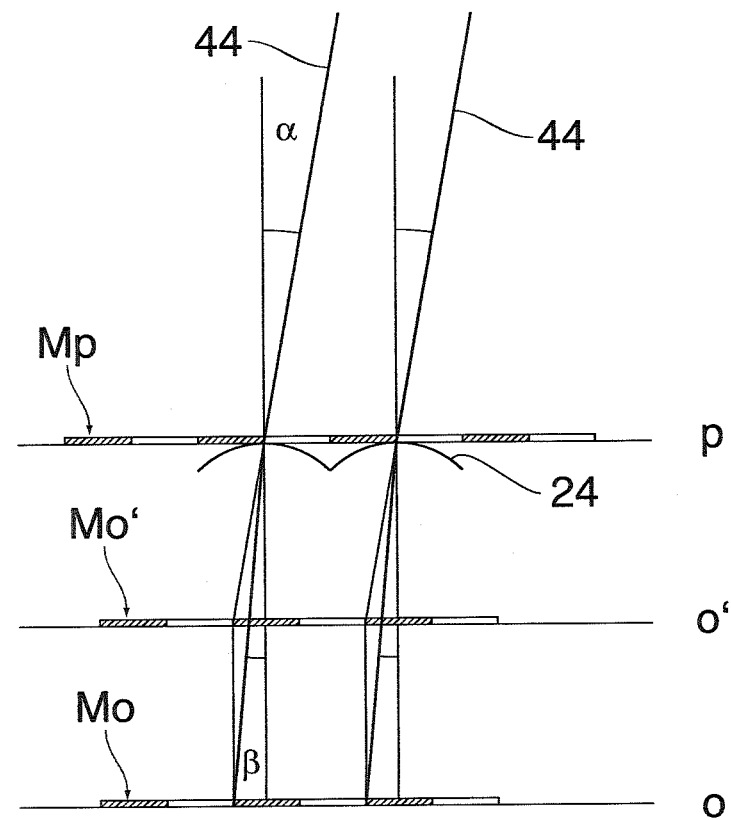
FIG. 4 is a diagram illustrating a construction of a channel mask for a viewing position with a non-zero skew angle.

FIG. 4 illustrates a situation where the part of the screen 16 is seen by a viewer under a certain skew angle α. More precisely, FIG. 4 shows rays 44 which each connect the reference point U (FIG. 2) to an apex of one of the lenses 24. It is assumed in FIG. 4 that the reference point U is so far away from the principal plane p that the rays 44 are practically parallel.

Due to the non-zero skew angle α, the channel mask Mo in the object plane is laterally offset from the channel mask Mp in the principal plane. However, the offset is mitigated due to the fact that the light rays are refracted at the apex of each lens 24 in accordance with Snell's law, with the skew angle a as incident angle and an emergent angle β. In the example shown, it is assumed that the refractive medium forming the lens array 18 has a refractive index 2, as compared to a refractive index 1 of the ambient air. In this case, it follows from Snell's Law that $$\sin(\alpha)/\sin(\beta)=2.$$

The effect of this refraction can be approximated by considering an auxiliary object plane o' half way between the object plane o and the principal plane p, and by using a central projection, with the reference point U as the center, to project Mp onto the auxiliary object plane o'. This results in a channel mask Mo' which is at least approximately congruent with Mo.

Figure 5:
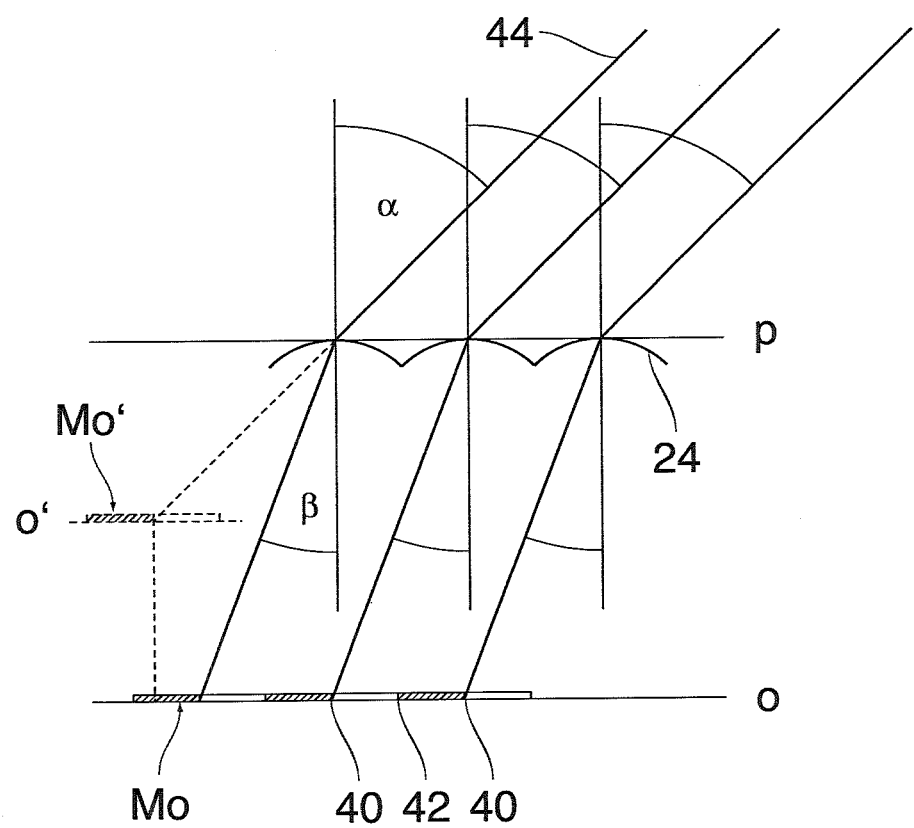
FIG. 5 is a diagram illustrating the construction of the channel mask for an even larger skew angle.

However, when the skew angle α is larger, as in FIG. 5, it is preferable to construct the channel mask Mo directly by tracing the rays 44 on the basis of Snell's law. Of course, by tracing the rays from the reference position U through the apex of each cylindrical lens, one obtains only the first-type boundaries 40 of the channel mask Mo. The second-type boundaries 42 can however be found just by taking the center position between adjacent first-type boundaries 40.

For comparison, the result of the approximative method using a central projection onto the auxiliary object plane o', as in FIG. 4, has been illustrated in dashed lines in the left part of FIG. 5. It can be seen, that there is a considerable offset between the channel mask Mo' obtained in this way and the channel mask Mo obtained by ray tracing.

Figure 6:
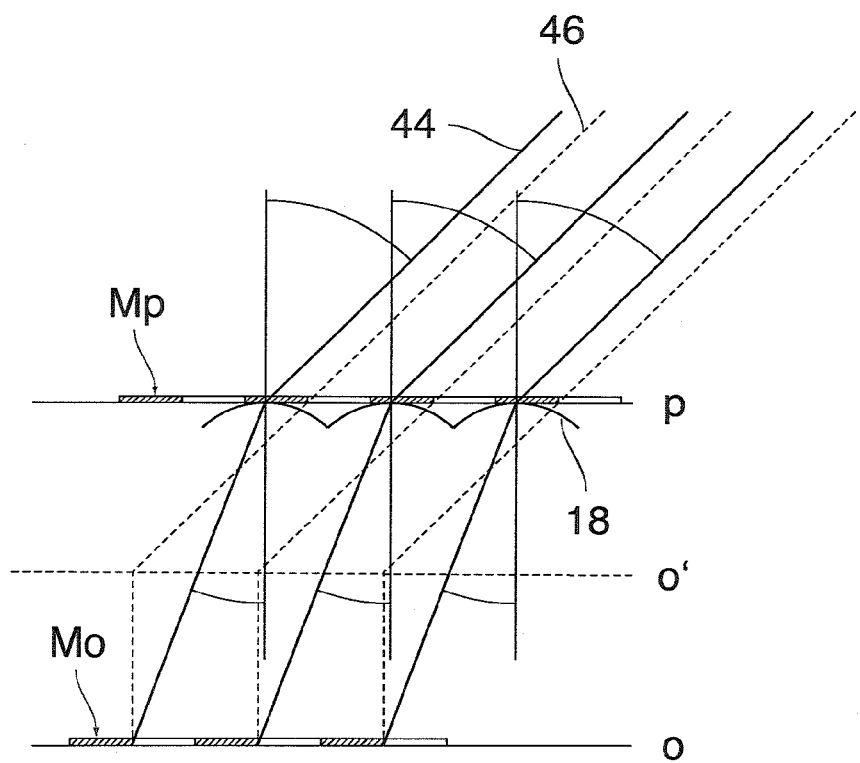
FIG. 6 is a diagram illustrating a relation between channel masks in an object plane and a principal plane of a parallax filter device.

It will be observed that the channel mask Mp in the principal plane p is not actually needed for constructing the channel mask Mo. Nevertheless, the channel mask Mo implicitly defines also a corresponding channel mask Mp, as has been shown in FIG. 6. This channel mask Mp can be constructed "reversely" by moving the channel mask Mo into the auxiliary object plane o' and then drawing straight lines 46 from the boundaries of the channel zones in the object plane o' to the reference point U. The points where these lines 46 pass through the principal plane p define the boundaries of the channel zones of the channel mask Mp. Thus, the construction of the channel mask Mo by ray tracing is equivalent to defining the channel mask Mp in a suitable position relative to the lens array 18 (with channel zone boundaries offset from the apex lines of the cylindrical lenses) and then using the central projection to construct the channel mask Mo'.

Figure 7:
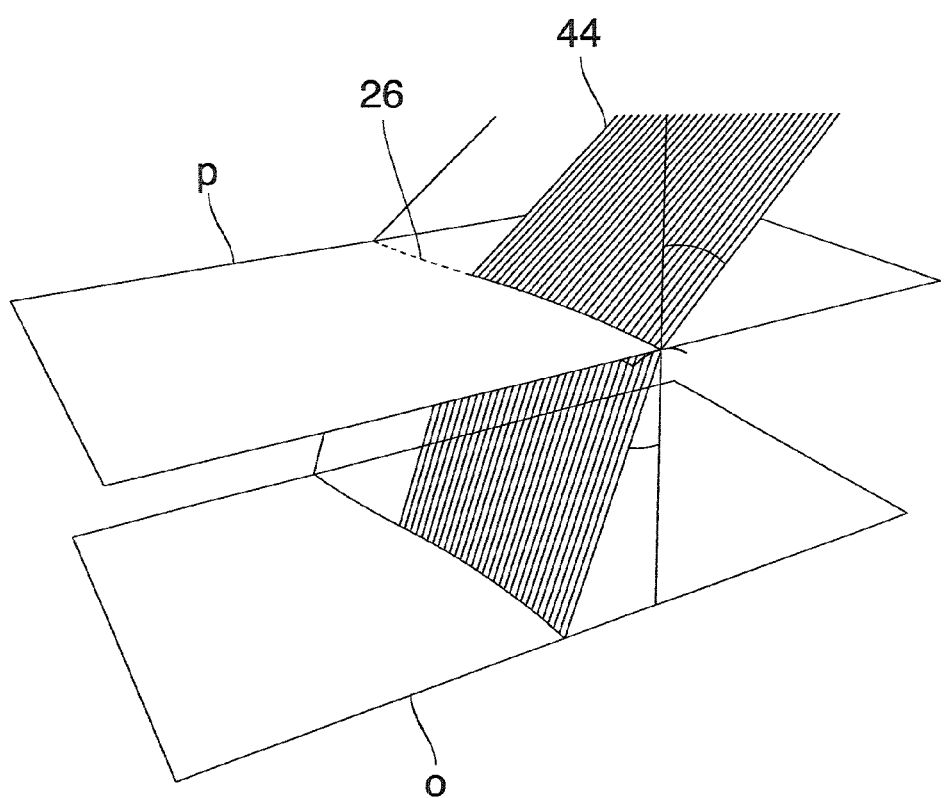
FIG. 7 is a schematic perspective view illustrating a ray tracing step for a plurality of points in the principal plane and the object plane.

If the cylindrical lenses 24 can be considered to be straight with sufficient accuracy, it is sufficient to calculate the refracted rays 44 only once for each cylindrical lens in order to construct the channel mask Mo. However, when the apex lines 26 of the lenses are curved, as in FIG. 2, it is preferred to trace a band of rays 44 passing through several points along the apex line 26, as has been shown in FIG. 7.

Figure 8:
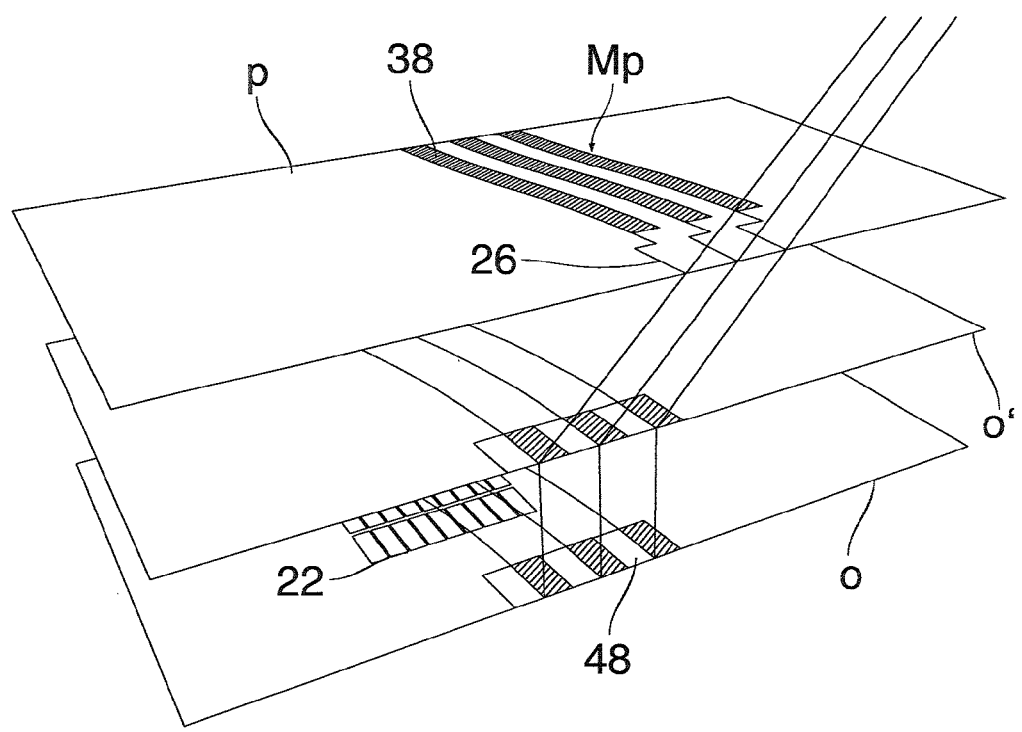
FIG. 8 is a perspective view showing a comparison between different construction methods for a channel mask in the principal plane.

FIG. 8 shows a comparison between a corrected channel mask Mp constructed in accordance with the invention, i.e. by ray tracing, and a non-corrected channel mask as defined directly by the apex lines 26 of the cylindrical lenses. It can be seen that the offset between the corrected and uncorrected channel masks can amount to more than the width of an individual channel zone 38. Thus, when the uncorrected channel mask, as defined directly by the apex lines 26, would be used for constructing a channel mask 48 in the object plane o by means of central projection onto the auxiliary object plane o', the viewer would perceive an inverted three dimensional image when looking at the screen under this large skew angle. The invention permits to avoid this effect even for displays with a large screen and/or for short viewing distances.

Figure 9:
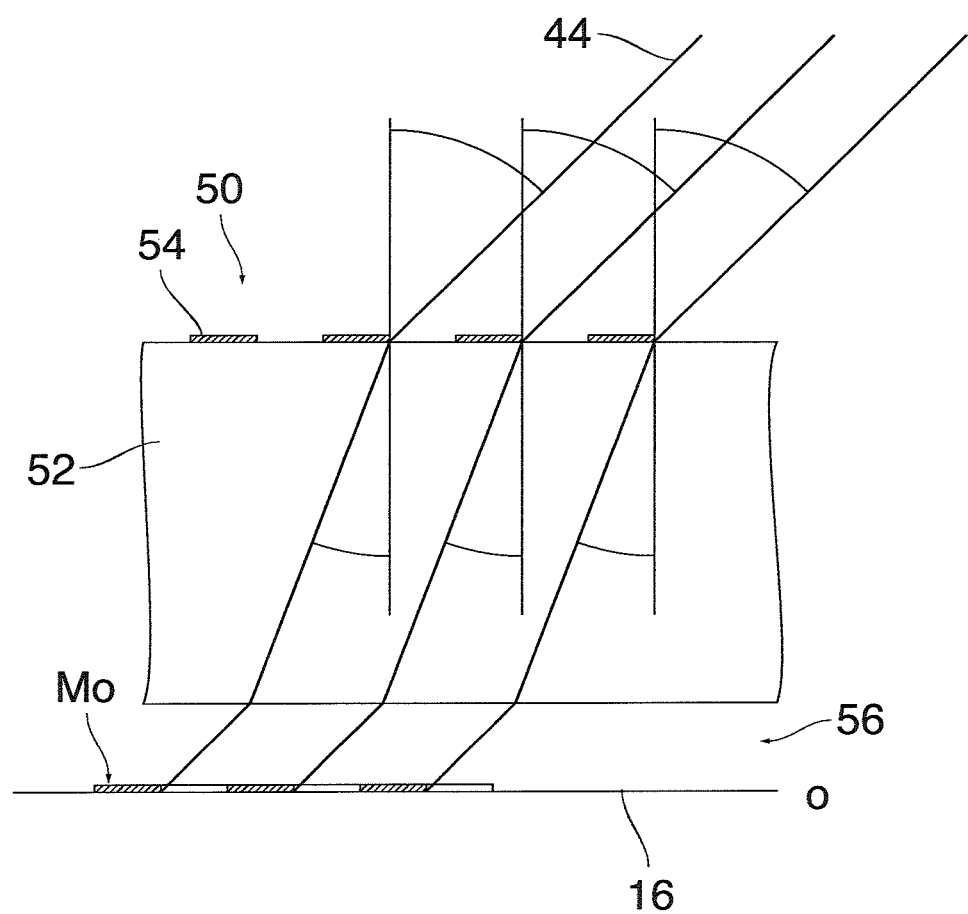
FIG. 9 illustrates a ray tracing process for a display with a parallax filter device in the form of a stripe array.

The invention is not limited to systems in which a lens array is used as parallax filter device. FIG. 9 shows an example, where the parallax filter device is formed by a stripe array 50 constituted by a glass plate 52 with non-transparent stripes 54 printed on the top surface thereof. For a suitable viewing distance, the stripes 54 will obscure the pixels in a left channel zone for the right eye of the user and the pixels in a right channel zone for the left eye of the user. In this example, the glass plate 52 is separated from the screen 16 by an air gap 56 (or possibly a transparent layer with a refractive index different from that of the glass plate).

In this embodiment, the rays 44 passing through the edges of the stripes 54 are traced on their way through the glass plate 52, where they are refracted twice, so as to find the boundaries of the channel zones of the channel mask Mo in the object plane o.

Of course, an air gap similar to the air gap 56 may also be present between the cylindrical lens 18 and the screen 16 in the previous embodiment, and then a refraction of the rays 44 at the boundary of this air gap would also have to be taken into consideration in the ray tracing process.

In a similar way the invention can deal with arbitrary stacks of optical media consisting of a number of layers, each of them of individual thickness and with an individual refraction index, including the possibility of layers that are positioned on the viewer's side of principal plane p.

Figure 10:
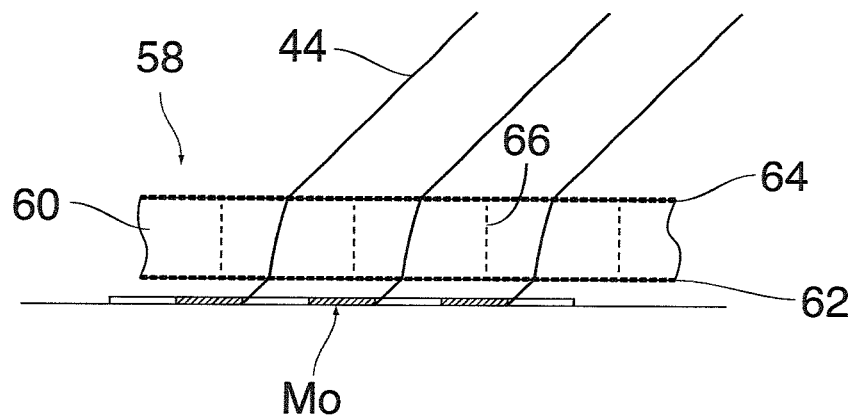
FIG. 10 illustrates a ray tracing process for a display with a controllable parallax filter device.

FIG. 10 illustrates yet another embodiment where a parallax filter device is formed by a controllable gradient lens array 58. This lens array is formed by a transparent plane-parallel plate 60 made of a material the refractive index of which varies when an electric field is applied. Fine patterns of electrodes 62 and 64 are formed on the opposite surfaces of the plate 60, and when a voltage is applied between one of the electrodes 62 and an opposing one of the electrodes 64, the column of the material between these electrodes will change its refractive index. Consequently, by appropriately controlling the voltages applied to the pairs of electrodes 62, 64, it is possible to create a gradient in the refractive index of the plate 60. This gradient will cause a refraction of the rays 44, as has been shown in FIG. 10.

In this way, it is possible to create a pattern of stripe-shaped lenses 66 the boundaries of which have been indicated by dashed lines in FIG. 10. When the refractive index increases from the boundary 66 towards the center of the lens and then decreases again towards the opposite boundary, the effect is equivalent to the effect of a cylindrical lens. with the only difference that the refraction of the ray 44 does not only occur at the surface of the lens but also continuously within the material of the lens. Nevertheless, it is possible to calculate the refraction and to trace the rays 44 so as to construct the channel mask Mo.

This statement holds also for the range of other approaches for switchable or non-switchable lens arrays, e.g. switchable or non-switchable anisotropic lens, switchable LCD-lens and others.

Figure 11:
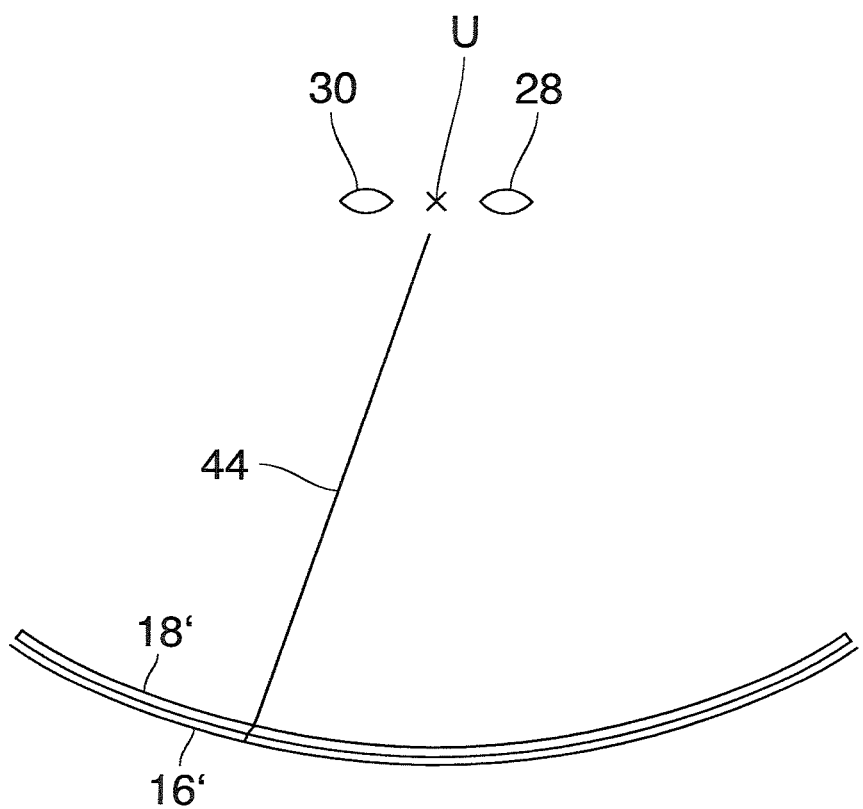
FIG. 11 is a schematic top plan view of an autostereoscopic display with a curved screen.

The invention is even applicable to autostereoscopic displays which have a curved screen 16' and a curved lens array 18', as shown in FIG. 11. The effect of the curvature may easily be taken into account when tracing the rays 44.

In a practical embodiment, a ray tracing software will be implemented in the computer system 10 (FIG. 1) for calculating the rays through the various points of the lens array and the screen. When the eye tracking system 20 detects a shift in the reference position U of the user, the calculations will be updated for the two new viewing positions of the left eye and the right eye.

In an alternative embodiment, it is possible to perform ray tracing calculations for a plurality of different viewing positions. In that case, a viewing position may be defined as a position of a single eye, regardless of whether this eye is a left eye or a right eye of the user. Then, the necessary ray tracing calculations need to be made only once, and the views for which the image information is presented on the screen are selected in accordance with the information provided by the head tracking system 20. This embodiment may also be used in a multi-view system permitting two or more users to watch a three-dimensional scene simultaneously. A multi-view system of this type has been described in applicants co-pending European patent application EP 14 200 536.2.

In yet another embodiment, it is also possible to make actual measurements for ray tracing rather than calculating the rays. For example, two optical sensors may be arranged in the positions of the eyes 28, 30 of the viewer in FIG. 11, and then the pixels on the screen 16' may be energized one after the other to see whether at least one of the two sensors detects a corresponding optical signal. Then, depending upon which of the two sensors has received a signal, the pixel that has been energized can be assigned to one of the channel zones.

These measurements may be made for a single viewing position or for several viewing positions.

In general, ray tracing by measurement has the advantage that any manufacturing tolerances in the production of the lens array and/or the mounting of the lens array on the screen are eliminated automatically.

A measurement for a single viewing position will normally not be sufficient to derive the exact shape and position of the lens array. However, by making measurements for two or more viewing positions, it will generally be possible to remove the ambiguity in the data, so that the exact shape and position of the lens array can be calculated from the measurement results. Then channel masks for other viewing positions which have not been measured, may be constructed by ray tracing calculations.

What is claimed is:

1. A method of constructing a channel mask for an autostereoscopic display, the display comprising an electronically controlled screen covered by a parallax filter device that includes a refractive medium and is configured to obscure certain areas on the screen for a left eye of a viewer and to obscure certain other areas on the screen for a right eye of the viewer, the channel mask being a two-dimensional geometric object that permits to assign to each point on the screen one of a number of viewing positions of an eye of the viewer, comprising the steps of:

constructing the channel mask by tracing light rays that propagate from selected points on the screen and are refracted at the parallax filter device.

2. The method according to claim 1, wherein the parallax filter device is a lens array.

3. The method according to claim 1, wherein the parallax filter device is a stripe array.

4. The method according to claim 1, wherein the step of tracing includes the step of employing a software algorithm for ray tracing.

5. The method according to claim 1, further comprising the step of calculating a plurality of channel masks for at least two different viewing positions.

* * * * *